United States Patent [19]
Hatfield et al.

[11] Patent Number: 4,888,763
[45] Date of Patent: Dec. 19, 1989

[54] METHOD AND APPARATUS FOR DETECTING THE COLLISION OF DATA PACKETS UTILIZING A PREASSIGNED TRANSCEIVER CODE IN THE PREAMBLE

[75] Inventors: Walter B. Hatfield, Fair Haven, N.J.; Nathan Tobol, Wrentham, Mass.; Frederick W. Scholl, Riverdale, N.Y.

[73] Assignee: Codenoll Technology Corporation, Yonkers, N.Y.

[21] Appl. No.: 167,074

[22] Filed: Mar. 11, 1988

[51] Int. Cl.[4] .............................................. H04J 3/26
[52] U.S. Cl. .................................... 370/85.2; 370/94.1
[58] Field of Search ............................. 370/85, 89, 94; 340/825.5, 825.51

[56] References Cited
U.S. PATENT DOCUMENTS

| | | | |
|---|---|---|---|
| 4,063,220 | 12/1977 | Metcalfe et al. | 340/147 |
| 4,282,512 | 8/1981 | Boggs et al. | 340/147 |
| 4,345,250 | 8/1982 | Jacobsthal | 340/825.5 |
| 4,560,984 | 12/1985 | Scholl | 340/825.5 |
| 4,561,091 | 12/1985 | Scholl et al. | 370/85 |
| 4,578,799 | 3/1986 | Scholl et al. | 375/87 |
| 4,596,011 | 6/1986 | Kobayashi et al. | 370/85 |
| 4,701,909 | 10/1987 | Kavehrad et al. | 370/85 |
| 4,771,391 | 9/1988 | Blasbalg | 370/85 |

*Primary Examiner*—Douglas W. Olms
*Attorney, Agent, or Firm*—Pennie & Edmonds

[57] ABSTRACT

Through the method and apparatus of the present invention the collision of two packets can be detected with a high degree of accuracy under a variety of conditions. The preamble of each packet transmitted is modified to include collision detection data comprising an initial pulse having an amplitude sufficiently high to be detected even when attenuated and having a pulse width twice the normal data pulse width followed by a transceiver code of a predetermined length unique to each transceiver. Thus, in the event two packets collide, the collision may be detected by recognizing a second large pulse within a time period less than the sum of the packet duration and the gap between packets, by determining if a large initial pulse has a pulse width larger than the generated pulse width, and by determining if the transceiver code echoed back to the transmitting transceiver is equal to transceiver code stored in memory on the transceiver. If a transceiver detects a collision, a large collision detect pulse having an amplitude and pulse width similar to the amplitude and pulse width of the large initial pulse is transmitted within the time period less than the sum of the packet duration and interpacket gap, thus assuring that the collision is detected by all transceivers.

15 Claims, 6 Drawing Sheets

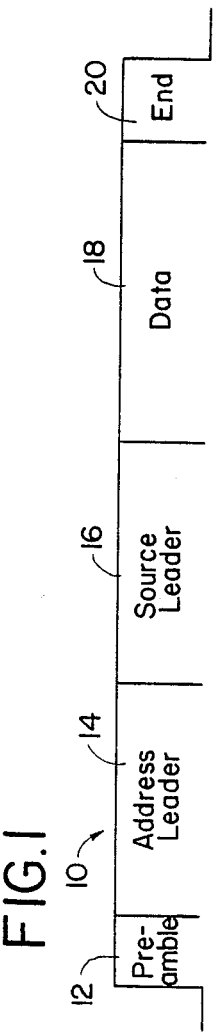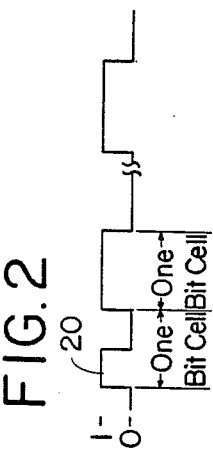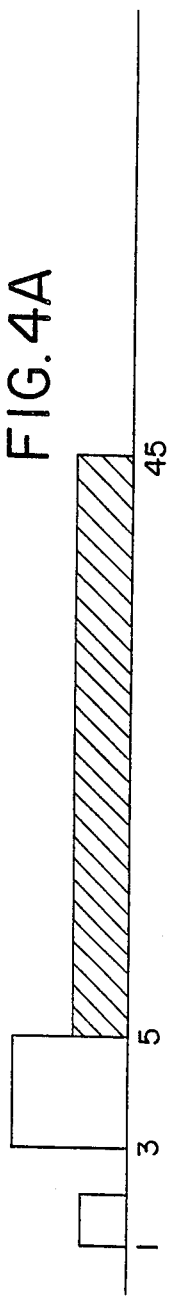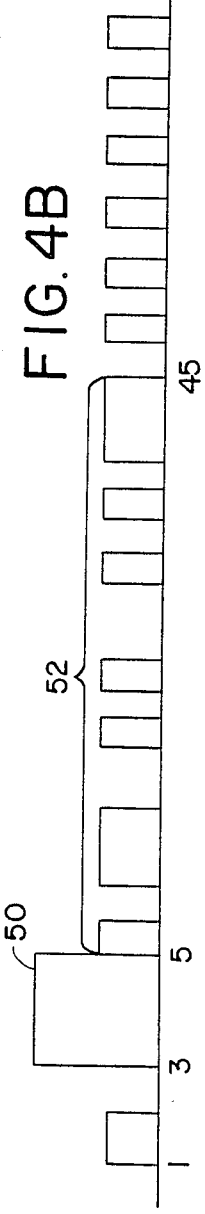

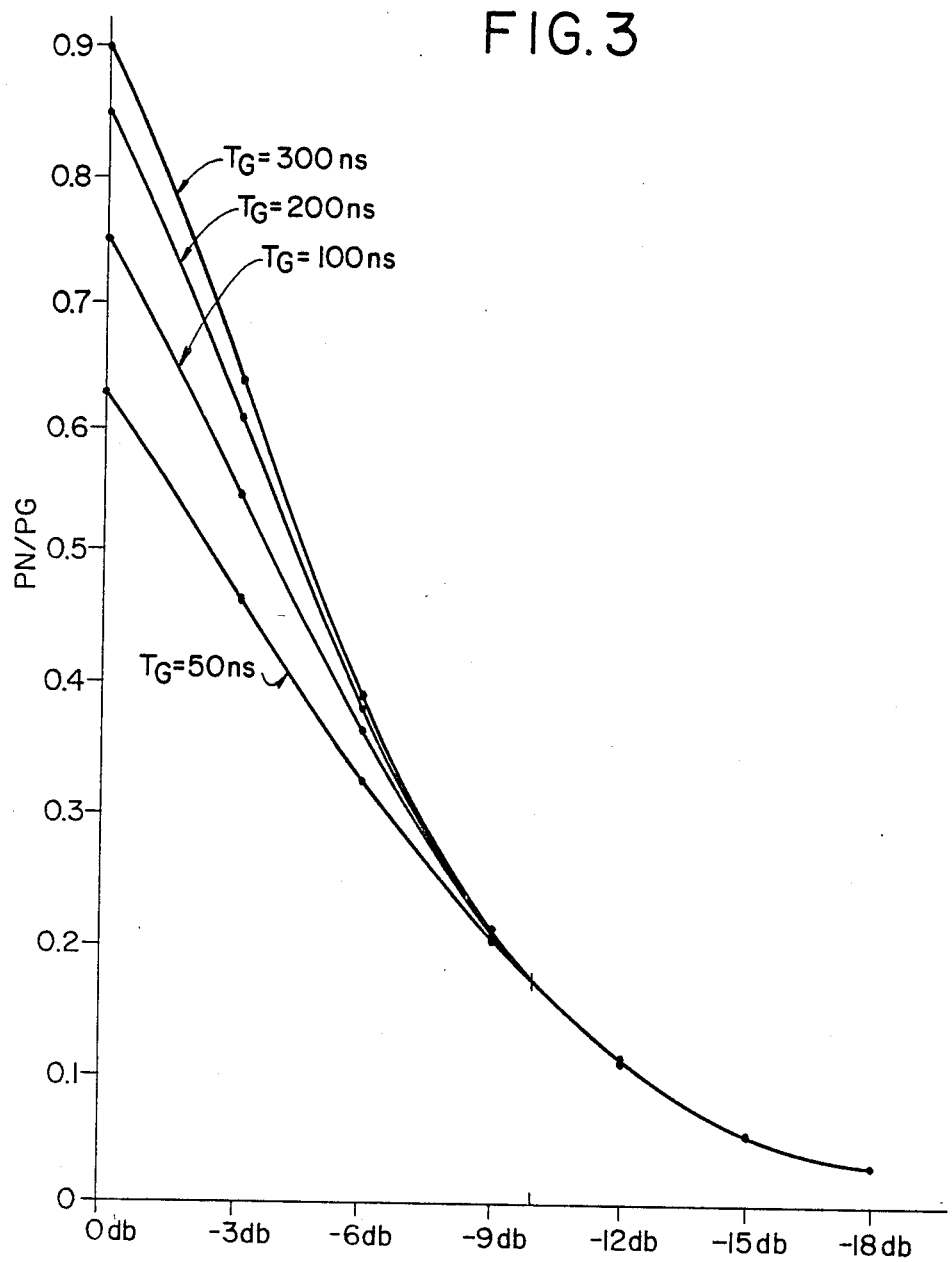

METHOD AND APPARATUS FOR DETECTING THE COLLISION OF DATA PACKETS UTILIZING A PREASSIGNED TRANSCEIVER CODE IN THE PREAMBLE

RELATED PATENT AND APPLICATION

A related patent is U.S. Pat. No. 4,560,984 and a related application is U.S. application, No. 157,545, filed Feb. 18, 1988 for METHOD AND APPARATUS FOR DETECTING THE COLLISION OF DATA PACKETS, which are incorporated herein by reference.

BACKGROUND OF THE INVENTION

The present invention relates to a method and apparatus for detecting when a collision occurs between two or more binary data signal packets when they are received by a single binary data signal receiver.

Computers are widely used for computation, data processing, control and communication systems. Frequently, access to a computer is made by way of remote consoles or terminals each tying into the computer. The communications link between the terminals and the computer is advantageously established by using optical fibers because of their known properties of high signal speed, structural simplicity, low distortion, and isolation from interference.

Computer communications are characteristically in the form of short bursts of binary information. By taking advantage of the characteristics of computer communications, systems have been developed which allow many users to use a single computer at the same time and for different computers to communicate with one another over a single network.

Two switching techniques are generally used in computer communication systems to permit non-exclusive use of a computer. These switching techniques are known as the circuit switching technique and the packet switching technique. Data communications over the switched public telephone line are illustrative of the circuit switching technique, and the Ethernet system is typical of the packet switching technique.

The circuit switching technique establishes a connection between a computer and a terminal only when data is to be transmitted. However, because the time required to establish a connection may be very large compared to the actual time of a communication, especially in the case of a short communication, this technique is slow, inefficient and expensive.

In contrast, the packet switching technique maintains the communications connection at all times but uses it only to transmit data in the form of packets of binary information. Short communications are transmitted by a single packet while longer or bursty communications are transmitted by a series of packets. The packets are of a duration of about 60 microseconds, and if a communication cannot completely fit onto a single packet, more than one packet is transmitted separated by an interpacket gap of about 10 microseconds in duration. Data rates in the Ethernet system, for example, are 10 Megabits/second so that a single bit has a pulse width or duration of 100 nanoseconds and a packet contains about 6,000 bits.

The packet is typically divided into two primary sections, the header and the data, each of which has a different purpose. The header is the portion of the packet which is initially received and contains such information as the address to which the packet is to be sent, the address of the sender of the packet and other information that the particular system requires. Following the header is the data section in which the substance of the communication is contained either wholly for a short communication, or partially for a longer communication. The packet may include an additional section which follows the data section which contains information relating to error checks or to packet linking.

Because packets are transmitted from different transmitters at random time intervals, it is possible that packet collisions will occur because more than one packet is transmitted at the same time. When a collision of packets is detected, an instruction is sent to retransmit the original data so that another attempt may be made to receive the packet without a collision. If a collision of packets is not detected, the information transmitted is lost since the signal received is unintelligible as it is a sum of the overlapping packets.

Numerous techniques are known in the art for detecting a data collision. Ordinarily, these techniques are implemented at each terminal that is transmitting a data packet by examining the echoed back version of the transmitted signal. In U.S. Pat. No. 4,063,220, an exclusive OR gate at a signal transmitter compares the transmitted signal with the signal present on the communication cable, i.e. "echoed back", and aborts transmission when they are not the same. Another technique is to monitor the DC level of the signal received from the communication line and, if this level is higher than a specified threshold, assume there is a data collision.

Alternatively, as disclosed, for example, in U.S. Pat. No. 4,282,512, the receiver can look for data transitions that occur at timings different from those expected for the received data. U.S. Pat. No. 4,561,091 discloses a data communications receiver with a collision detection circuit for comparing a signal from a timing circuit with the received data signal and for producing a collision detection signal when the received data signal fails to change within the duration of the output signal from the timing circuit. The duration of the output signal from the timing circuit is equal to the longest data signal interval.

U.S. Pat. No. 4,560,984 discloses a method for detecting the collision of data packets in which a signal pulse, having an amplitude much larger than a data pulse, is substituted for the initial bit of the packet. The receiver tests for a pulse much larger than a data pulse. If two large signal pulses are received within a time period less than or equal to the sum of the duration of the packet and the time period between packets, a collision has occurred.

However, the above methods do not detect collisions for certain conditions. For example, the above methods do not detect the collision of two signals which arrive at the receiver at approximately the same time. In addition, the above methods do not always detect collisions that may arise involving an attenuated signal. In optical communication systems, it has been found that up to a 7 db loss (i.e. 80% decrease) of optical power may occur between the signal transmitted and the signal received. This loss of power may arise due to the length of transmission and the connectors or repeaters the signal passes through. In some cases of collision, the amplitude difference between the attenuated signal and the non-attenuated signal is so great that the attenuated signal has little effect on the non-attenuated signal and the collision is undetectable by current collision detection techniques.

U.S. application Ser. No. 157,545 filed Feb. 18, 1988 for METHOD AND APPARATUS FOR DETECTING THE COLLISION OF DATA PACKETS, addresses some of these problems and discloses a system in which the first twenty-four bits of the packet are modified to include collision detection data comprising an initial pulse having an amplitude sufficiently high to be detected even when attenuated and having a pulse width twice the normal data pulse width followed by a twenty bit code generated randomly at bit cell locations 5-24 in which ten pulses out of the twenty are at a high binary data signal level.

A collision is detected by determining if a large initial pulse has a pulse width larger than the generated pulse width, determining if a subsequent large pulse occurs within the remainder of the packet and by determining if more than ten pulses at bit cell locations 5-24 have a high binary data signal level.

SUMMARY OF THE INVENTION

We have found that still a higher degree of accuracy in collision detection can be achieved using the method and apparatus of the present invention. Moreover the present invention assures the detection of a collision of a high powered signal and low powered signal by the transceiver of the high powered signal.

In a preferred embodiment of an invention, the preamble is modified to include collision detection data comprising synchronization pulses followed by an initial large pulse having an amplitude sufficiently high to be detected even when attenuated and having a pulse width twice the normal data pulse width and a unique forty-one bit code which corresponds to a unique forty-one bit code assigned to the transceiver at time of manufacture.

In the event two packets collide, the collision may be detected as in the '984 patent by detecting a second large pulse within a time period less than the sum of the packet duration and the gap. If, however, the two packets arrive at nearly the same time and are not detectable by the methods of the '984 patent, the forty-one bit transceiver code stored at the transceiver is compared to the forty-one bit code in the preamble of the packet echoed back to the transceiver. If the two codes are not equal, a collision is reported.

If a collision is detected, the transceiver which detects the collision transmits a large collision detect pulse, similar to the large initial pulse transmitted with the packet, to the other transceivers connected in the system. This pulse is transmitted within the time period commencing with the start of the packet and ending after the minimum duration of a message packet and an interpacket gap. As a result every transceiver receives two large initial pulses in a time period less than the minimum duration of a message packet and gap. The large collision detect pulse transmitted will appear to the other transceivers as a large pulse having a pulse width larger than the generated pulse width or as a second large pulse in the packet, both of which indicate a collision and are detectable by all the transceivers. This insures that a transceiver which did not detect the collision initially nevertheless will be informed that a collision has occurred.

For example, in the collision of a low powered (high attenuated) and high powered (low attenuated) signal, only the low powered signal transceiver may detect the collision, but the large pulse collision detect signal transmitted by the transceiver of the low powered signal will be detected by the transceiver which transmitted the high powered signal as well as all the other transceivers thereby assuring accurate detection of a collision by all transceivers.

BRIEF DESCRIPTION OF THE DRAWINGS

These and other objects, features and advantages of the invention will be more readily apparent from the following description of a preferred embodiment of the invention in which:

FIG. 1 is a signal waveform envelope illustrating a packet of data.

FIG. 2 is a graphical representation of a portion of a data signal packet used in the invention.

FIG. 3 is a graphical representation of the minimum ratio of the data pulse amplitude to the large pulse amplitude in order to detect the large pulse for different values of signal attenuation.

FIGS. 4a and 4b illustrate the location of the collision data in the preamble of the packet.

DETAILED DESCRIPTION OF THE PREFERRED EMBODIMENTS

Figure 5:
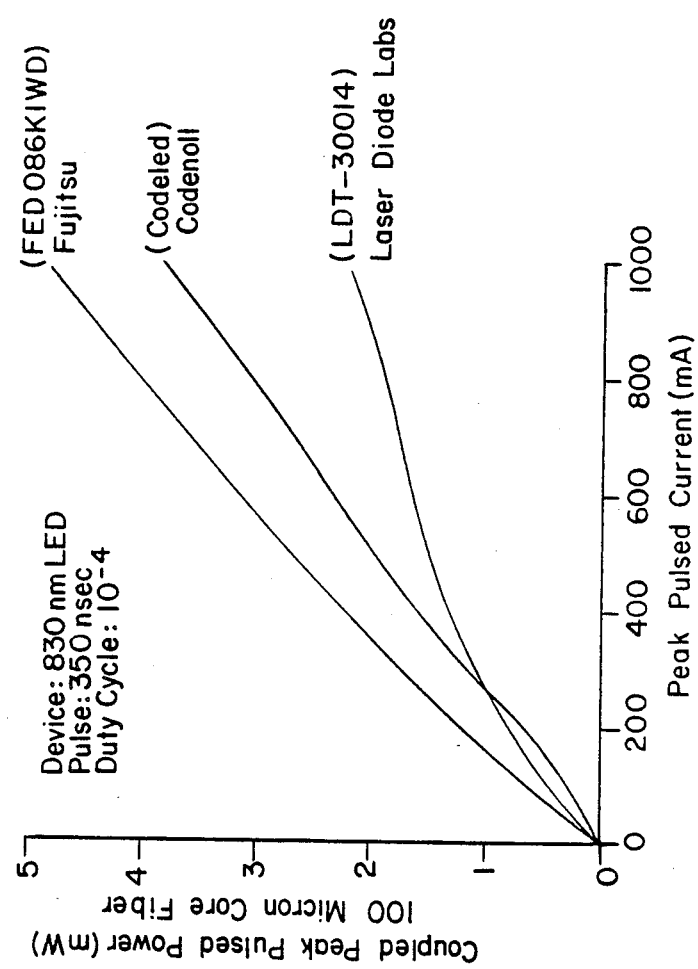
FIG. 5 is a graphical representation of the optical output of a light emitting diode as a function of input current which may be used in the invention.

In FIG. 1, a bit stream chart is shown illustrating a typical data packet used in a packet switching system such as the Ethernet communications network. The packet, generally designated 10, comprises a preamble 12, an address leader 14, a source leader 16, a data bit series 18 and an end section 20. Preamble 12, address leader 14 and source leader 16 are collectively known as a header. Packet 10 begins with preamble 12 which is generally in the form of a single synchronization or mark bit, or alternatively a string of bits. Preamble 12 is followed by address leader 14 which is a series of bits that designates the destination of the packet. After address leader 14 is source leader 16 which is a series of bits that designates the source of the packet. Data bit series 18 follows source leader 16 and contains the substance of the communication of packet 10. Data bit series 18 may be followed by end section 20 which includes various error checks or information on linking of the packet with a succeeding packet.

Typically, as shown in FIG. 2, each bit of the packet is transmitted in the form of a bit cell which is a phase encoded version of the binary data bit. For example, in "Bi-Phase L" encoding, there is a signal transition in each bit cell whose direction is the value of the data bit. Typically, a low to high transition represents a high bit state (or 1) and a high to low transition represents a low bit state (or 0). When optical fibers are used as the communications link, a high signal corresponds to the presence of optical energy in the fiber while a low signal corresponds to the absence of optical energy. Midway between successive signal transitions, it may be necessary to have a set up transition so that the next data transition is in the correct direction. In particular, a set up transition is needed whenever it is necessary to generate two successive bits having the same binary state. Further details concerning such encoding are set forth in U.S. Pat. No. 4,282,512 which is incorporated herein by reference.

In the method and apparatus of the present invention, a first portion of the preamble is encoded so that a collision between two packets can be detected under a variety of conditions, including the collision of a low powered signal and a high powered signal. In particular, a large pulse is substituted at the beginning of the preamble after the synchronization pulses and the width of such pulse is set to a value larger than the width of a bit cell. In addition, a unique transceiver code is substituted for a section of the preamble, such code preassigned to each transceiver and having a predetermined length.

Preferably the width of the initial large pulse is set to an integral multiple of the width of a bit cell, for example 200 nsec. in the Ethernet system, and is located after two synchronization pulses at the beginning of the preamble. The amplitude of the pulse must be sufficiently large to be detected and distinguished, even if attenuated. The graph in FIG. 3 illustrates for a given attenuation value and pulse width the minimum amplitude ratio of the normal pulse (PN) to the large pulse (PG). For example, if the large pulse width is 200 ns, and the attenuation value, is $-3$ db, then the minimum ratio of PN/PG in order to assure the detection of large pulses in the packet is 0.6.

In addition, in accordance with the invention, the forty-one bit transceiver code which is unique to each transceiver is transmitted at bit cells 5 to 45 (see FIG. 4a) immediately following the large initial pulse. This code is initially obtained from a non-volatile storage area on the transceiver such as ROM. The pulse width of the code is equal to the standard data pulse width, preferably 100 nsec for an Ethernet network, and the amplitude is likewise equal to the amplitude of a data pulse. Thus, as illustrated in FIG. 4b, the large pulse 50 is followed by a forty-one bit code 52 at bit cell locations 5 to 45.

Ordinarily, a collision will be detected by detecting two initial large pulses occurring within the minimum duration of a message packet and the interpacket gap. If however the two initial large pulses are substantially coincident, they will not be detected as two pulses. In such case, since the transceiver code generated and transmitted from each transceiver is different, the codes contained in two colliding coincident packets will combine to form another code that is not equal to the code stored in ROM of the transceiver.

Using this information about the characteristics of the preamble, the collision of data packets can be detected with a high degree of accuracy. Upon receipt of a packet, the collision detection circuit first looks for the large initial pulse and measures the pulse width. If the pulse width is larger than the generated pulse width a collision is assumed. For example, if the generated pulse width is 200 nsec. and the pulse width measured at the receiver is 300 nsec., then the detection circuitry reports that a collision has occurred. Preferably, to allow for signal noise that may occur, a collision is not reported unless the measured pulse width is greater than the generated pulse width plus 10% of the generated pulse width. Thus, in the case of the 100 nsec. Ethernet pulse width, a collision is detected if the measured pulse width is greater than 220 nsec.

The collision detection circuit also checks for the occurrence of a subsequent large pulse in the packet which also indicates that a collision has occurred.

If the large initial pulse is measured to be the proper pulse width, the collision detection circuit checks the bit cells containing the transceiver code and performs a bit by bit comparison of the code stored in memory at the transceiver and the code received in the packet echoed back to the receiver. If the codes are not equal, a collision is reported.

Upon report of a collision, a collision detect signal comprising a large pulse similar to the initial large pulse is transmitted to the other receivers within the time period commencing with the start of the packet and ending with the minimum duration of a packet and the interpacket gap. This causes a second large pulse having a pulse width greater than the normal pulse width to appear in the signal received by all transceivers within the time period equal to the minimum duration of a packet and an interpacket gap following receipt of the first large pulse at the beginning of the original message packet. As a result, every transceiver detects two initial pulses within the minimum time period and is thereby informed that a collision has occurred. Thus, if the transceiver of a high powered signal did not detect a collision with a low powered signal because the low powered signal did not cause a noticeable effect on the high powered signal, the large collision detect pulse, generated by the transceiver which transmitted the low powered signal, will be detected by the transceiver of the high powered signal to indicate a collision.

When an optical link is used to connect the transmitter and receivers, the binary data signal is generated over the optical transmission medium by a light emitting device such as a laser or a light emitting diode. The large initial pulse is produced by pulsing the light emitting device so that optical pulse is produced with an optical intensity greater than that associated with a high data bit.

FIG. 5 is a graphical representation of the optical intensity radiated by preferred light emitting devices as a function of the electrical current input. In order to produce the desired optical impulses with amplitudes greater than a high data signal level, the light-emitting device must be able to generate a continuous range of optical intensities for a wide range of input current values without reaching a saturation value. Light emitting diodes such as those identified in FIG. 5 are used since as shown in FIG. 5 the optical power radiated does not saturate for the range of input current values used in the invention.

Figure 6:
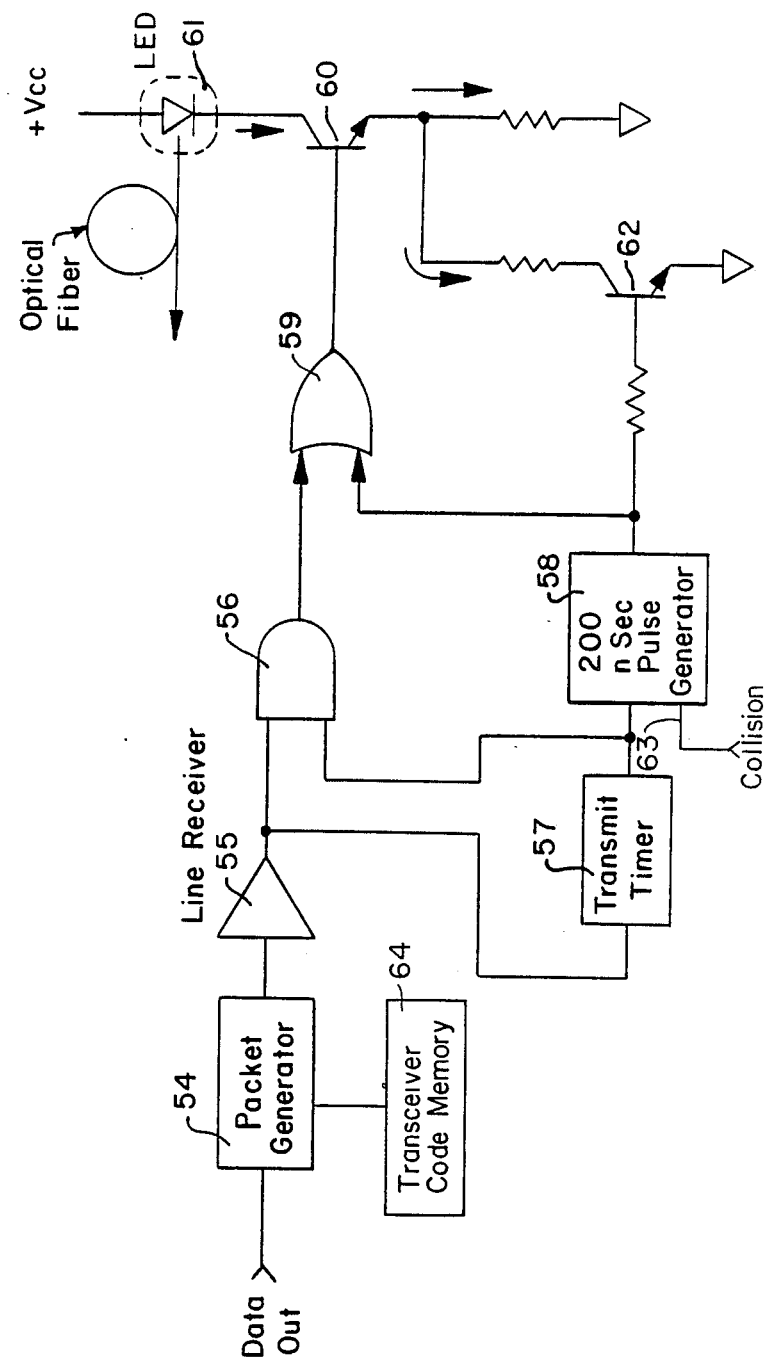
FIG. 6 is a block diagram showing a preferred embodiment of a transmitter used to generate the data signal packets of the invention.
Figure 7:
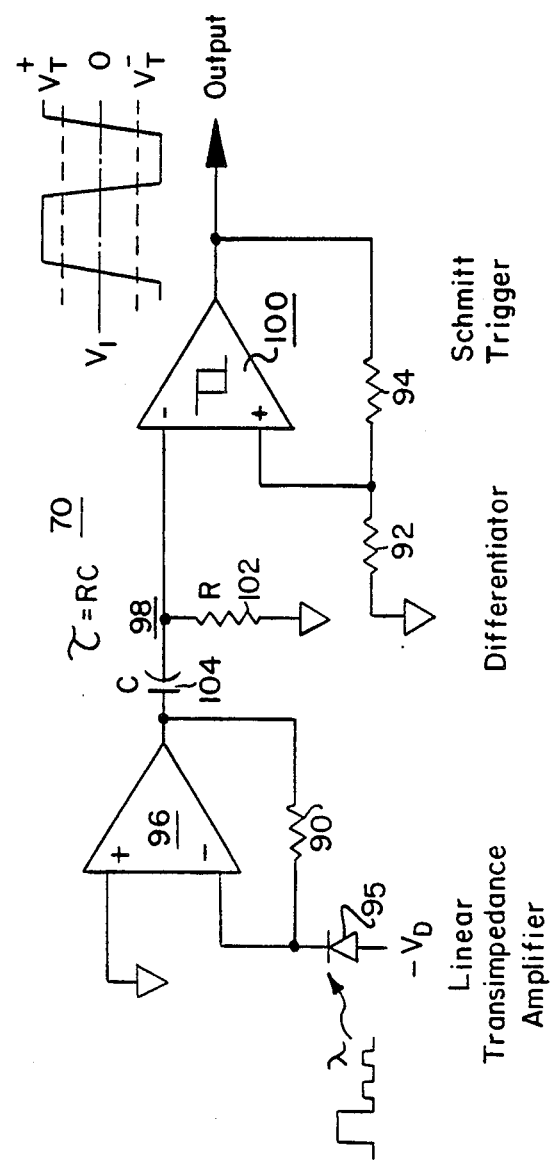
FIG. 7 is a block diagram showing a preferred embodiment of the photodetector used in the receiver depicted in FIG. 8.
Figure 8:
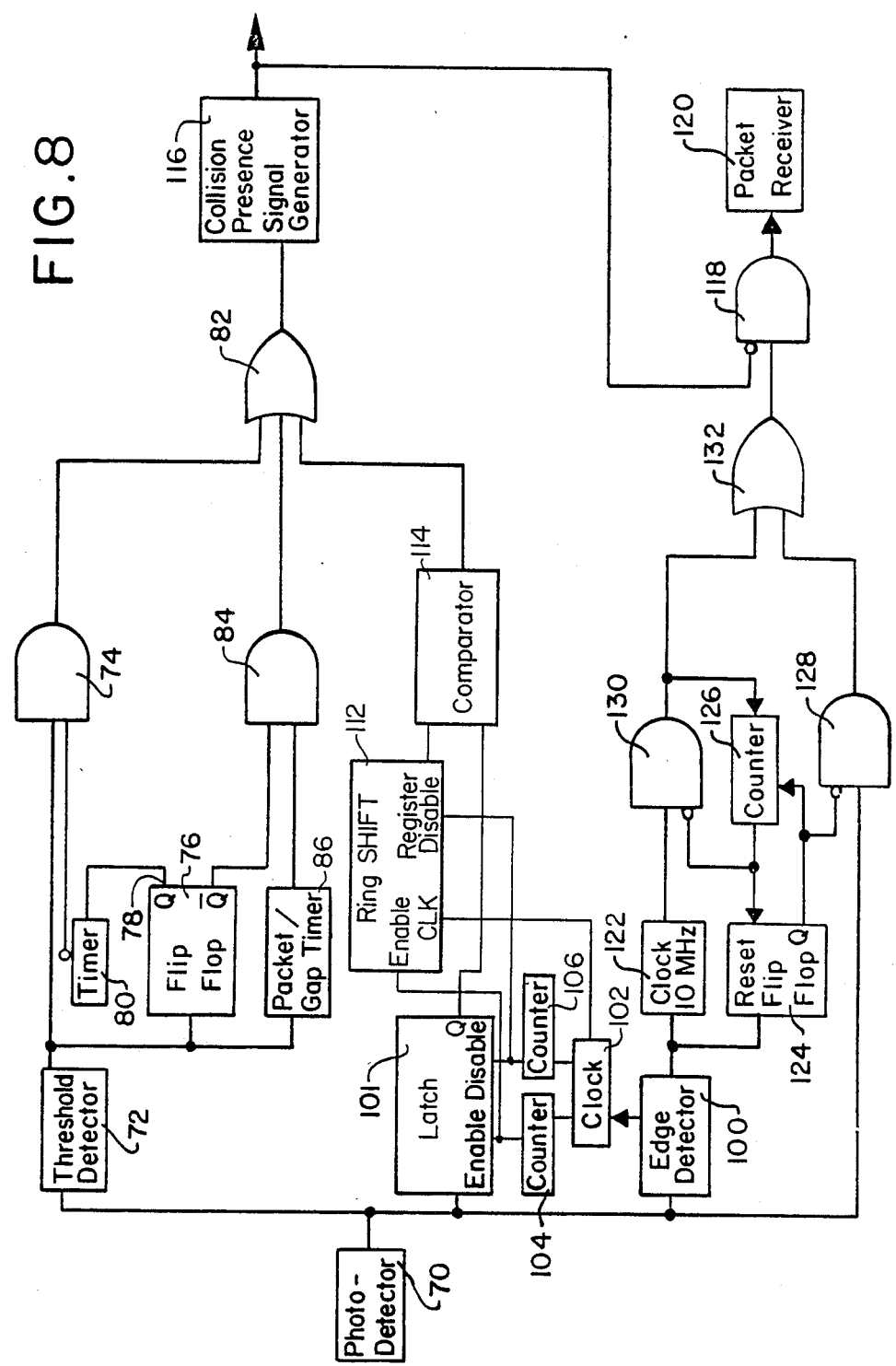
FIG. 8 is a block diagram showing a preferred embodiment of a receiver used to detect the collision of the data signal packets of the invention.

FIGS. 6, 7 and 8 are block diagrams illustrating preferred embodiments of the transmitter and receiver portions of the transceiver used to generate and detect the signal packet.

Referring to FIG. 6, the transmitter comprises a packet generator 54, line receiver 55, AND gate 56, timer 57, pulse generator 58, OR gate 59, transistors 60 and 62 LED 61 and transceiver code memory 64. The packet generator receives the data to be output in the packet and generates the packet of binary data bits having the format illustrated in FIG. 1 and the preamble, excluding the large initial pulse, depicted in FIGS. 4A and 4B. Thus the clock pulses are generated, followed by the transceiver code stored in the transceiver code memory 64 along with the remainder of the information contained in the data packet which is output to line receiver 55, through AND gate 56, OR gate 59, transistor 60 to LED 61 which generates optical pulses corresponding to the packet information to be transmitted over the optical fiber. The initial pulse of the packet from line receiver 55 enables transmit timer 57 which outputs a high data signal to pulse generator 58 and AND gate 56 thereby enabling pulse generator 58 to output a 200 nsec. pulse and synchronizing the 200 nsec. pulse with the data from packet generator 54. When the input to AND gate 56 is high, the data from packet generator 54 is passed through to OR gate 59 which OR's the data with the 200 nsec. pulse generated by pulse generator 58 thus combining a 200 nsec. pulse with the data from the packet generator. The pulse generated by pulse generator 58 is also input to transistor 62 which causes an increase of input current to LED 61 thereby producing a higher power optical signal for a duration of 200 nsec. to generate the large initial pulse 50 referred to in FIG. 3.

Referring to FIG. 7, photodetector circuit 70 receives the output of an optical fiber (not shown) at photodiode 95 and converts the optical signal into an electrical signal using linear transimpedance amplifier 96, differentiator 98, and Schmitt trigger 100. The circuit has a time constant T equal to the value of resistor 102 multiplied by the value of capacitor 104. As discussed further below, this time constant is a parameter used to determine the minimum amplitude of the large initial pulse according to the following equation (which follows the graph depicted in FIG. 3):

$$\frac{P_{HI}}{P_{LO}} \geq \frac{1.5}{\alpha(1 + e^{-t_2/T})}$$

where:

$P_{HI}$ is the amplitude value of the initial pulse;

$P_{LO}$ is the amplitude value of the data pulse;

α is the worst case ratio of the amplitude of two optical signals measured at a particular receiver signal;

$t_2$ is the data pulse width; and

T is the time constant of the differentiator circuit in the receiver.

As shown in FIG. 8, the output of photodetector 70 is connected via logic gates 128, 132 and 118 to packet receiver 120. The output of photodetector 70 is also connected to threshold detector 72, latch 101 and edge detector 100 which generate control signals for gates 118 and 128. Threshold detector 72 receives the output of photodetector 70 and determines if the output is greater than a threshold which is chosen to detect the large initial pulse. When the threshold of threshold detector 72 is exceeded, the threshold detector 72 generates a high signal level that is applied to AND gate 74, flip-flop 76 and packet/gap timer 86. Flip-flop 76 acts as a toggle switch. Its non-inverted output 78 is input to the enable input of the timer 80 and its inverted output is provided to a first input of AND gate 84. Initially, flip-flop 76 is in a reset state such that a high signal from threshold detector 72 sets the flip-flop causing the non-inverted output to change to a high output. This high output is input to timer 80 to start the timer 80 running. Timer 80 is set to run for a period equal to the pulse width of the generated initial pulse. Timer 80 outputs a high binary signal level when running and the output changes to a low binary signal level once the timer has timed out (i.e. run for the set time period). The output of timer 80 is inverted and input to the second input of AND gate 74. Thus, if timer 80 has timed out and the signal is still exceeding the threshold detector, the output of the AND gate 74 is a high signal level indicating that the pulse width of the large initial pulse has exceeded the pulse width of the transmitted pulse. This output is input to OR gate 82. Flip-flop 76 and timer 80 are reset at the end of each packet so the next packet can be tested.

The output of threshold detector 72 is also used to enable packet/gap timer 86, which runs for a period equal to the length of the packet plus the length of the minimum gap that should exist between packets. For example, for an Ethernet protocol the time period of timer 86 is 70 microseconds, 60 microseconds for the packet and 10 microseconds for the gap between packets. Similar to timer 80, packet/gap timer 86 outputs a high binary signal level while the timer is running and changes to a low binary signal level when the timer times out. The output of packet/gap timer 86 is input to the second input of AND gate 84.

As indicated above, the inverted output of flip-flop 76 is input to a first input of AND gate 84. This output is low and AND gate 84 is disabled while the flip-flop is in the set state. If, however, the signal from photodetector 70 goes below the threshold and subsequently rises above the threshold of threshold detector 72, a second high signal level will be generated by detector 72 which will toggle flip-flop 76 causing it to enter the reset state. In the reset state, the inverted output of flip-flop 76 is high and AND gate 84 is enabled. As a result, if timer 86 is still running when AND gate 84 is enabled, the output of AND gate 84 will be a high binary signal level indicating that more than one large pulse has occurred within the period equal to the duration of the packet and the gap between packets.

The output of photodetector 70 is also input to edge detector 100 which detects the leading edge of the first pulse of the packet. Once the initial leading edge of the packet is detected by edge detector 100, the edge detector provides a high binary data signal to the enable line of clock 102. This causes clocking signals to be output in binary data signal form to counters 104 and 106. The clock signals have the same timing as the data stream in the received signal. Counter 104 outputs a high signal level after four clock pulses, equivalent to four bit cells, are counted and counter 106 outputs a high signal level after forty-five clock pulses are counted. The output of counter 104 is input to the enable line of latch 101 and ring shift register 112 which stores the transceiver code and the output of counter 106 is input to the disable line of latch 101 and ring shift register 112. Thus after the clock has counted four bit cells, the latch 101 and ring shift register 112 are enabled and when the clock has counted forty-five bit cells the latch 101 and ring shift register 112 are disabled.

The clock 102, latch 101, ring shift register 112 and comparator 114 provides for bit by bit comparison of the forty-one bit transceiver code received in the preamble of the packet and the forty-one bit transceiver code stored in the transceiver in ring shift register 112.

Thus, after the fourth bit cell is counted, the shift register 112 and latch 101 are enabled and the fifth bit of the preamble at latch 101 and the first bit of the transceiver code stored in the shift registered 112 are compared at comparator 114. Similarly, at the next clock pulse, the sixth bit of the preamble and the second bit of the shift register are compared; and so on. Illustratively, comparator 114 is an exclusive OR gate. If the two bits compared are equal, the comparator 114 outputs a low binary signal. However if any pair of bits in the two sets of forty-one bits are not equal, a high signal is output from the comparator 114. This signal is input to OR gate 82 signifying that a collision has occurred.

Therefore, if any one of AND gate 74, AND gate 84 and comparator 114 outputs a high data signal level, the output of OR gate 82 will also be at a high data signal level indicating that a collision has occurred.

The output of OR gate 82 is input to collision presence signal generator 116 which generates a signal that is applied to the transmitter portion of the circuitry to indicate that it is necessary to retransmit the packet being sent. This signal is also used to reset the threshold detection circuitry of FIG. 8.

In addition the output of OR gate 82 is input to 200 ns pulse generator 58 (FIG. 6) at line 63. This causes the pulse generator 58 to generate a large collision detect pulse to notify all transceivers that a collision has occurred. If the output of the OR gate 82 is at a low data signal level, no packet collisions have occurred and the collision presence signal generator and large collision pulse is not generated.

In addition, the output of OR gate 82 and signal generator 116 is inverted and input to AND gate 118 to control the flow of the received signal from photodetector 70 to the packet receiver 120 so that the received signal is input to packet receiver 120 only when no packet collisions have occurred. In addition, since some clocking information may be lost in the collision detection process, the collision detection data is stripped from the beginning of the preamble and replaced with signals equivalent to the clock pulse typically found in the preamble of the packet.

To do this, the output of photodetector 70 is input to edge detector 100 which detects the leading edge of the first pulse. The output of edge detector 100 is input to clock 122 and flip-flop 124. Clock 122 produces clock signals having the same timing as the data stream in the received signal, e.g., 10 MHz clock signals in the case of a system following the Ethernet protocol. The signal from edge detector 100 enables the clock which generates the preamble clock pulses to be inserted into the preamble at bit cell locations 1-45. Upon receipt of a high signal level from edge detector 100, flip-flop 124 outputs a high signal level to the enable line of counter 126 and to the inverted input of AND gate 128, thereby disabling gate 128 and stripping the preamble from the received signal. Initially the output of counter 126 is a low signal which is inverted at an input to AND gate 130 so as to enable that gate. As a result clock signals from clock 122 are applied via AND gate 130, and OR gate 132 to AND gate 118 and packet receiver 120 in place of the preamble. Once counter 126 is enabled, it counts up clock pulses from AND gate 130 to a preset value, indicative of the length of the collision data, in this example forty-five, and generates a high signal level when that preset value is reached. The high signal level resets flip-flop 124 causing the noninverting output to go low, thereby enabling gate 128. The high signal from counter 126 is also inverted and input to AND gate 130, thereby disabling that gate. As a result, the output of clock 122 is now blocked at gate 130 and the output of photodetector 70, which is the packet signal, is provided via AND gate 128 and OR gate 132, to AND gate 118 and packet receiver 120.

While the invention has been described in conjunction with specific embodiments, it is evident that there are numerous variations in the invention which will be apparent to those skilled in the art in light of the foregoing description.

What is claimed is:

1. In a communication network, a method for detecting collisions of varying overlap among packets of binary data transmitted over said network comprising:
   (a) generating in each binary data signal packet that is transmitted over the network a collision signal comprising:
      (i) a large initial pulse having an amplitude greater than that of a high binary data signal level and a pulse width greater than the pulse width of a binary data signal; and
      (ii) a transceiver code unique to each transceiver device from which a binary data signal packet is transmitted;
   (b) at at least one location, monitoring the network throughout a transmission session during which data packets are transmitted to detect collisions between data signal packets transmitted from different transmitters;
   (c) producing a first error signal if a signal detected on the network includes a large pulse having a pulse width greater than the pulse width of the generated initial pulse;
   (d) producing a second error signal if a signal detected on the network includes a transceiver code which is not equal to the transceiver code in a signal packet that is transmitted from a first transceiver device;
   (e) producing a third error signal if a subsequent large pulse is detected on the network within a time period equal to the length of the packet and the length of a gap between successive packets being transmitted; and
   (f) if a collision is detected, transmitting over the network a collision detect pulse having an amplitude and pulse width similar to the amplitude and pulse width of the large initial pulse;
   wherein collisions of packets of binary data are detected if any one or any combination of said first, second and third error signals are produced.

2. The method of claim 1 wherein the large initial pulse and large collision detect pulse have an amplitude sufficiently large to be detected at a remote location after attenuation of the pulses.

3. The method of claim 1 wherein the large initial pulse is generated at the beginning of the packet after two synchronizing pulses.

4. The method of claim 1 wherein the large collision detect pulse is transmitted within a time period having a duration equal to the length of a binary data signal packet and a minimum gap between successive packets and commencing with transmission of the binary data signal packet.

5. The method of claim 1 wherein the predetermined number of data signals in the transceiver code is equal to forty-one.

6. In a communication network, an apparatus for detecting collisions of packets of binary data transmitted over said network comprising:
   means for generating in the binary data packets that are transmitted over the network a collision signal comprising:

a large initial pulse having an amplitude greater than that of a first binary data signal level and a pulse width greater than the pulse width of a binary data signal; and a transceiver code unique to each apparatus;

first means for transmitting over the network said data signal packets having said collision signal, said first transmitting means receiving said data signal packets having said collision signal from said generating means;

means for receiving said data signal packet from said network;

means for monitoring the network throughout a transmission session during which data packets are transmitted to detect collisions between data signal packets transmitted from different transmitters, said monitoring means being connected to said receiving means;

means coupled to said monitoring means for producing a packet collision signal if one or any combination of the following is detected by said monitoring means:

a large initial pulse within the received data signal packet having a pulse width greater than the pulse width of the generated initial pulse; or a transmitted transceiver code within the received data signal packet which is not equal to the transceiver code in the packet that is transmitted from the apparatus; or a subsequent large pulse within a time period equal to the length of the packet and the length of a gap between successive packets being transmitted; and second means for transmitting, if a collision is detected, a collision detect pulse having an amplitude and pulse width similar to the amplitude and pulse width of the large initial pulse, said second transmitting means being connected to said producing means.

7. The apparatus of claim 6 wherein:

said first transmitting means comprises an optical signal transmitting means connected to said generating means which converts said output of said generating means into a modulated optical signal and transmits said modulated optical signal over an optical transmission medium; and said receiving means comprises an optical receiving means which receives said modulated optical signal from said optical transmission medium and converts said modulated optical signal into a modulated electrical signal that is applied to said monitoring means.

8. The apparatus of claim 7 wherein the optical signal transmitting means is an edge-emitting light diode.

9. The apparatus of claim 6 wherein the transceiver code is stored in non-volatile memory accessible by the generating means and retrieved from memory by the generating means.

10. The apparatus of claim 6 wherein the large collision detect pulse is transmitted within a time period having a duration equal to the length of a binary data signal packet and a minimum gap between successive packets and commencing with transmission of the binary data signal packet.

11. In a communication network, a plurality of devices for detecting collisions of packets of binary data transmitted over said network, each such device comprising:

means for generating in the binary data packets that are transmitted over the network a collision signal comprising:

a large initial pulse having an amplitude greater than that of a first binary data signal level and a pulse width greater than the pulse width of a binary data signal; and a transceiver code unique to each device;

first means for transmitting over the network said data signal packets having said collision signal, said first transmitting means receiving said data signal packets having said collision signal from said generating means;

means for receiving said data signal packet from said network;

means for monitoring the network throughout a transmission session during which data packets are transmitted to detect collisions between data signal packets transmitted from different transmitters, said monitoring means being connected to said receiving means;

means coupled to said monitoring means for producing a packet collision signal if one or any combination of the following is detected by said monitoring means;

a large initial pulse within the received data signal packet having a pulse width greater than the pulse width of the generated initial pulse; or a transmitted transceiver code within the received data signal packet which is not equal to the transceiver code in the packet that is transmitted from the device; or a subsequent large pulse within a time period equal to the length of the packet and the length of a gap between successive packets being transmitted; and second means for transmitting, if a collision is detected, a collision detect pulse having an amplitude and pulse width similar to the amplitude and pulse width of the large initial pulse, said second transmitting means being connected to said producing means.

12. The network of claim 11 wherein:

said first transmitting means comprises an optical signal transmitting means connected to said generating means which converts said output of said generating means into a modulated optical signal and transmits said modulated optical signal over an optical transmission medium; and said receiving means comprises an optical receiving means which receives said modulated optical signal from said optical transmission medium and converts said modulated optical signal into a modulated electrical signal that is applied to said monitoring means.

13. The network of claim 12 wherein the optical signal transmitting means is an edge-emitting light diode.

14. The network of claim 11 wherein the transceiver code is stored in non-volatile memory accessible by the generating means and retrieved from memory by the generating means.

15. The network of claim 11 wherein the large collision detect pulse is transmitted within a time period having a duration equal to the length of a binary data signal packet and a minimum gap between successive packets and commencing with transmission of the binary data signal packet.

* * * * *